United States Patent [19]

Scholle

[11] 4,105,818

[45] Aug. 8, 1978

[54] GAS BARRIER PACKAGING MATERIAL

[75] Inventor: William R. Scholle, Corona del Mar, Calif.

[73] Assignee: Scholle Corporation, Northlake, Ill.

[21] Appl. No.: 597,761

[22] Filed: Jul. 21, 1975

Related U.S. Application Data

[63] Continuation-in-part of Ser. No. 370,594, Jun. 18, 1973, abandoned.

[51] Int. Cl.² .............................................. B32B 3/02
[52] U.S. Cl. .................................... 428/192; 206/527; 428/910; 428/474; 428/500; 428/518; 428/516; 428/520; 426/127
[58] Field of Search ............... 426/415, 127, 129, 130; 428/500, 518, 474, 190, 192; 206/527

[56] References Cited

U.S. PATENT DOCUMENTS

| | | | |
|---|---|---|---|
| 3,274,004 | 9/1966 | Curler et al. | 426/127 |
| 3,429,717 | 2/1969 | Cook | 428/522 |
| 3,455,302 | 7/1969 | Liloia et al. | 428/192 X |
| 3,579,416 | 5/1971 | Schrenk | 428/518 |

*Primary Examiner*—P. C. Ives
*Attorney, Agent, or Firm*—Gary, Juettner & Pyle

[57] ABSTRACT

Multiple ply packaging materials formed of certain polymer films, each having a gas permeability of 10 or less cc per 100 square inches per mil thickness over a 24 hour period at one atmosphere pressure, and 73° F. and 50% R.H., such as polyvinylidene chloride, exhibit unexpectedly high gas barrier properties in comparison with a single film of the same equivalent thickness.

1 Claim, No Drawings

GAS BARRIER PACKAGING MATERIAL

CROSS REFERENCE

This is a continuation-in-part of my co-pending application, Ser. No. 370,594, filed June 18, 1973, now abandoned.

BACKGROUND OF THE INVENTION

Thermoplastic films have gained wide acceptance in the packaging industry, and such films are commonly employed to package foods in both liquid and solid form. Many thin films composed of polymeric materials, however, are highly pervious to oxygen and other gases such as carbon dioxide. A pouch composed of polyethylene, for example, allows relatively rapid penetration of atmospheric oxygen and other gases into the interior thereof, in comparison to containers made of metal or glass.

In the packaging of many food products and other products which are sensitive to or reactive with oxygen, it would be desirable to provide a packaging or container material composed of a polymer with good gas barrier properties. The contamination of food products with oxygen after packaging often has many undesirable effects, including discoloration, deterioration and spoilage of the product, as well as significant loss in acceptable shelf storage life.

Heretofore, it has been generally accepted that the permeability of a given polymeric film is directly related to its thickness. Increasing the film thickness to reduce permeability to gases is not always feasible because of the higher cost and poor handling qualities of thick films.

SUMMARY OF THE INVENTION

I have discovered that the provision of certain vinyl and other polymeric films in multiple ply form unexpectedly increases their gas barrier properties in comparison with a single ply film of the same material and overall thickness.

DESCRIPTION OF THE PREFERRED EMBODIMENTS

The film employed in multiple ply form in accordance with the present invention is particularly characterized by having an oxygen or other gas permeability transmission rate of about 10 or less, said rate being expressed in terms of cc/100 sq. in. per mil thickness over a 24 hour period at one atmosphere pressure and at room temperature, or about 73° F., and 50% R.H. Suitable films may be composed of polyvinylidene chloride, sold under the trademark "Saran", polyvinylidene chloride coated or laminated on both sides with polyethylene ("Saranex") and polyamides, for example "Nylon". In the case of the "Saranex" film, the polyethylene coatings are present to facilitate formation of heat seals and do not materially affect the gas transmission rate. Other suitable films would apparently include biaxially oriented polypropylene, polyvinyl chloride, vinylidene chloride, vinyl chloride copolymers, polyacrylonitrile, acrylonitrile-styrene copolymers, polyesters, polyamides, and coated cellophane, all of which have low gas permeability rates.

The films may be employed in any range of thickness, although it is normally preferable to use the thinner films, which are less expensive and easier to handle in packaging applications. The preferred thickness range for each ply is from about 0.5 mil to about 4.5 mils, with about 1 to about 3 mils generally being preferred to achieve the desired properties in the final product.

The packaging material of the present invention is made up of at least two separate and superimposed plies. The multiple ply material may be fabricated by any convenient method, such as by superimposing two or more separate plies of the film and joining or bonding the edges and/or other selected areas of the plies together. The final structure thus comprises a plurality of superimposed contiguous plies.

The multiple-ply material can be formed in conventional manners into containers or packages, preferably of the type that may be sealed to exclude air. For example, the material may be employed to make bags or pouches having an open end which may be closed by heat or bonding after the contents have been inserted. In the alternative, the bag may be provided with a nozzle having an air tight cap.

It has been found that the films described herein, when fabricated into the multiple ply packaging material of the present invention, exhibit synergism by providing an unexpected decrease in gas permeability. It is commonly accepted that permeability of polymer films is directly proportional to the thickness of the film. Under such principle, for example, a 6 mil film would be expected to be half as permeable as a 3 mil film, and two superimposed plies of 3 mil film would be expected to have the same permeability as a 6 mil integral film.

Unexpectedly, however, it has been discovered that the relationship between gas permeability and overall thickness of a multiple-ply material is non-linear and that the provision of multiple plies or layers results in a reduced permeability that is substantially and significantly lower than the expected permeability. As a result, each of the layers in the multi-ply structure, considered individually, exhibits a substantially lower permeability than would be expected. Stated differently, the multiple ply material having a given thickness exhibits a permeability to gases that is materially less than the permeability of a single film of the same overall thickness.

As an explanation of the foregoing synergistic results, but not as a limitation on the present invention, it is therorized, first, that the use of a material composed of multiple plies having a given aggregate or overall thickness prolongs the time required for the material to reach a steady state of gas transmission compared to a single ply film of the same overall thickness, and second, that the steady state of transmission, once reached, is greatly reduced with the multi-ply material. These conditions are believed to result from a reduction in the pressure of the gas after having passed through the first ply, which substantially reduces the ability of the gas to penetrate through the second ply or successive plies. It will be understood that when a polymer film is exposed to a gas, the gas largely dissolves in the film, and the gas transmission rate increases from a low value to a substantially constant value as the gas saturation reaches equilibrium with the saturation point of the film. The latter steady-state transmission rate is what is commonly accepted as the transmission rate for film.

In further illustration of the present invention, the following examples are given.

EXAMPLE I

Packaging materials composed of single and multiple plies of polyvinylidene chloride ("Saran") were subjected to standard oxygen transmission testing with results expressed in terms of cc/100 sq. in. over 24 hours, at one atmosphere pressure, at 73° F. and 50% R.H., after attainment of steady-state transmission. The results were as follows:

| Structure | Transmission Rate |
|---|---|
| 1 Ply - 0.5 Mil | 2.0 cc $O_2$ |
| 1 Ply - 1.0 Mil | 1.0 cc $O_2$ |
| 2 Ply - 0.5 Mil/Ply | 0.42 cc $O_2$ |

As expected, the single ply 1.0 mil film had one-half the oxygen transmission rate of the single ply 0.5 mil film; but the two ply film, having the same overall or aggregate thickness of 1.0 mil, had an oxygen transmission rate 58% less than that of the single ply or integral 1.0 mil film.

EXAMPLE II

Films composed of polyvinylidene chloride coated on both sides with polyethylene ("Saranex") were formed into two ply packaging materials and compared with identical single ply films in terms of gas permeability. In Tests 2 and 3, thinner film was used than in Test 1, and permeability was measured for both oxygen and carbon dioxide.

| Test No. | No. of Plies | Transmission* | Relative Expected Transmission (%) | Relative Actual Transmission (%) |
|---|---|---|---|---|
| 1A | One | 0.124 cc $O_2$ | 100 | 100 |
| 1B | Two | 0.035 cc $O_2$ | 50 | 28.2 |
| 2A | One | 0.591 cc $O_2$ | 100 | 100 |
| 2B | Two | 0.164 cc $O_2$ | 50 | 27.7 |
| 2C | One | 2.31 cc $CO_2$ | 100 | 100 |
| 2D | Two | 0.335 cc $CO_2$ | 50 | 14.5 |
| 3A | One | 0.662 cc $O_2$ | 100 | 100 |
| 3B | Two | 0.197 cc $O_2$ | 50 | 29.8 |
| 3C | One | 2.26 cc $CO_2$ | 100 | 100 |
| 3D | Two | 0.40 cc $CO_2$ | 50 | 17.7 |

*Transmission figures are given in cc/100 sq. in./24 hrs. at 1 atm. at 73° F. 50% R.H.

From the foregoing, it may be seen that three different groups of "Saranex" film were tested. With each group, a single ply of the film was first tested. Then, two plies of the same film were arranged in a superimposed structure and tested.

In accordance with conventional film technology, it would be expected that the double thickness film would have about one-half the transmission rate of the single thickness film. Unexpectedly, however, the oxygen transmission rate of the two-ply material was reduced or decreased by an average of 71.4%, as contrasted to the expected 50% reduction. The carbon dioxide transmission rate of the two ply film was reduced by an average of 83.9% in comparison with the expected 50% reduction.

EXAMPLE III

A packaging material comprised of two superimposed contiguous plies of "Saranex #14", with each ply containing a 0.3 mil layer of polyvinylidene chloride, was compared to a single ply of "Saranex XO-2000.38" containing a single 0.7 mil layer of polyvinylidene chloride. The two ply structure was found to have about the same oxygen permeability as the single ply film, when tested in accordance with the procedure previously described. The two ply material, having a total polyvinylidene chloride film thickness of 0.6 mils, represents a 16.6% savings in the amount of film required to obtain the same oxygen barrier capability with a single film.

EXAMPLE IV

A comparison similar to that of Example III was made between a single or integral 2 mil ply of "Saran" film and a packaging material comprised of two superimposed contiguous plies of 0.75 mil "Saran" film. The two ply material, even though having 25% less polyvinylidene chloride than the single ply film, enjoyed an oxygen transmission rate slightly lower than that of the thicker single ply film.

EXAMPLE V

A comparison was made between indentical 1 mil polyamide ("Nylon") films in single and multiple ply structures in accordance with with Example I.

| Structure | Transmission Rate |
|---|---|
| 1 ply - 1 mil | 0.56 cc $O_2$ |
| 2 ply - 1 mil/ply | 0.18 cc $O_2$ |
| 4 ply - 1 mil/ply | 0.07 cc $O_2$ |

This particular test demonstrates the continuation and magnification of the synergistic effect as the number of plies is increased. In the two ply test, transmission was only 64% of the rate expected, i.e., 0.18 rather than 0.28; and in the four ply test only 50% of the rate expected, i.e., 0.07 rather than 0.14. Moreover, in the four ply test, the transmission rate was significantly less than half that in the two ply test, indicating continuation of the synergism.

Again, it is seen that the multiple ply packaging material significantly decreases gas permeability, or conversely significantly increases the gas barrier properties, beyond that expected from thickness considerations alone. In all cases, permeability to gases is materially less than the permeability of a single ply divided by the number of plies.

I claim:

1. A packaging material having improved gas barrier properties consisting of a plurality of separate and distinct, superimposed, contiguous plies of polymer film bonded together around their edges, said plies being formed of the same film and the film being selected from the class of films having a permeability to gases of about 10 or less cc per 100 square inches per mil thickness over a 24 hour period at one atmosphere pressure at 73° F and 50% R.H., said polymer film being selected from the class consisting of polyvinylidene chloride, polyvinylidene chloride and polyethylene film laminates, polyamides, biaxially oriented polypropylene, polyvinyl chloride, vinylidene chloride - vinyl chloride copolymers, polyacrylonitrile, acrylonitrile styrene copolymers, polyesters, and cellophane, said plies each having a thickness of 0.5 to 4.5 mils and together having a permeability to oxygen and carbon dioxide materially less than the permeability of a single ply of the film divided by the number of plies in said material.

* * * * *